United States Patent
Chau et al.

(10) Patent No.: US 7,305,412 B2
(45) Date of Patent: Dec. 4, 2007

(54) SYSTEM AND METHOD FOR CONVERSION FROM GRAPHICAL BUSINESS PROCESS REPRESENTATIONS TO STRUCTURAL TEXT-BASED BUSINESS PROCESS REPRESENTATIONS

(75) Inventors: Tak Seng Chau, Scarborough (CA); Kelly Michelle Lalonde, Toronto (CA); Lok Tin Loi, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 10/947,766

(22) Filed: Sep. 23, 2004

(65) Prior Publication Data
US 2005/0071312 A1   Mar. 31, 2005

(30) Foreign Application Priority Data
Sep. 30, 2003   (CA) .................................... 2443476

(51) Int. Cl.
*G06F 17/00*   (2006.01)
(52) U.S. Cl. ...................... 707/102; 705/1; 707/103 R
(58) Field of Classification Search ................ 707/102, 707/103 R, 1
See application file for complete search history.

(56) References Cited

U.S. PATENT DOCUMENTS

| | | | |
|---|---|---|---|
| 5,737,557 A | 4/1998 | Sullivan | 395/340 |
| 2002/0032669 A1* | 3/2002 | Smith et al. | 706/21 |
| 2002/0116362 A1 | 8/2002 | Li et al. | 707/1 |
| 2004/0249645 A1* | 12/2004 | Hauser et al. | 705/1 |

FOREIGN PATENT DOCUMENTS

WO   WO 02/093437   11/2002

OTHER PUBLICATIONS

Mendling et al., "A Comparison of BPML and BPEL4WS",Proceedings of the first conference "Berline XML-Tag". Berline 2003, pp. 305-316.*
Leymann et al. "Business Processes in a Web Service World", Aug. 2002, pp. 1-11. downloaded from: http://www-128.ibm.com/developerworks/webservices/library/ws-bpelwp/.*

* cited by examiner

*Primary Examiner*—Sana Al-Hashemi
*Assistant Examiner*—Hares Jami
(74) *Attorney, Agent, or Firm*—Hamilton & Terrile, LLP; Stephen A. Terrile

(57) ABSTRACT

Conversion from a graphical representation to a structural, text-based representation of a business process. A method and system identifies shared nodes in the graphical representation having more than one incoming control connection. Segmenting a graph based on the initial graphical representation based on the location of the shared nodes. Converting each segment of the graph to a set of corresponding segment-based structural, text-based representations. Creating a resultant structural text-based representation comprising the set of corresponding representations in which each of the segment-based representations is defined to potentially execute concurrently. Generating synchronization elements in the resultant representation defined with reference to the incoming control connections of the previously identified shared nodes, while maintaining the semantics of the initial graphical representation in the resultant structural text-based representation.

11 Claims, 5 Drawing Sheets

SYSTEM AND METHOD FOR CONVERSION FROM GRAPHICAL BUSINESS PROCESS REPRESENTATIONS TO STRUCTURAL TEXT-BASED BUSINESS PROCESS REPRESENTATIONS

BACKGROUND OF THE INVENTION

1. Field of the Invention

The present invention relates generally to computer-implemented representations of processes and more specifically to a system and method for conversion from graphical business process representations having certain types of node-connection configurations to structural text-based business process representations.

2. Description of the Related Art

A business process includes a defined set of actions taken in the course of conducting business. Through the use of computer systems, business processes can be automated. An automated business process typically requires input and generates output. A business process may be a single task or a complicated procedure such as a procedure for building a product. An example of a more complicated business process is a computer-implemented business transaction (carried out against a database) for the purchase of goods on the Internet. The term "business process" also includes other processes that are related to a business context in a broad sense. For example, a process used to manage donor lists for a charity is referred to as a "business" process although it relates to a charitable activity and not a business activity as narrowly defined.

For all business processes, but in particular for automated business processes, it is potentially advantageous to document the processes using a computer-implemented representation. Often business processes are graphically represented in a computer-implemented system using a visual representation.

Computer software such as the WebSphere™ Studio Application Developer Integration Edition (WSADIE) process tool distributed by IBM Corporation allows users to visually represent a business process as a graph having node, terminal and connection elements. Connection elements connect nodes as in a directed graph and provide a flow that is apparent in the visual representation and which is intended to represent the relationships between activities in business processes. In a graphical representation that is used to control a business process, control over the process is transferred from node to node as the connection elements are followed.

Alternatively, business processes may be represented in a computer system textually using a structural computer language, such as Business Process Execution Language for Web Services (BPEL4WS). BPEL4WS is used to describe business processes and is based on Extensible Markup Language (XML) specifications. BPEL4WS allows for text-based business process representations having a structure of hierarchical nested elements.

It is desirable to convert between graphical and text-based representations of business processes. However, the complex structure of many business processes renders such conversion difficult. In a business process represented in a graphical system, control dependency of one node or activity on another is defined by the flow of the control connections between the nodes. In a simple process, the control dependency follows a single path; when a first activity finishes, control is passed from that node to the next node following the control connection, and the next activity represented by the next node is executed.

However, for a complex process, there is typically no single path defining control dependency. Certain configurations of control connections and nodes in graphical representations present difficulties in the conversion to a structural text-based representation. One such configuration is the graphical representation of a "cross-over" process, in which a first node is connected to more than one subsequent node, and the execution of one of those subsequent nodes depends on receipt of output from that first node as well as output from another node which may be executed concurrently with the first. Another configuration presenting conversion difficulties is a conditional process that depends on an event or a fault: control is passed to one of many potentially nodes via one of many control connections, depending on the output from a previous node.

For such configurations, there may be a number of solutions by which the business process represented in the graphical representation may be converted to a structural text-based representation. Each of these text-based representations may be valid, in that the process represented provides the same result as the business process represented graphically. However, these possible solutions may not be consistent or easily derived. Further, they may not all necessarily reflect the correct semantics and relationships among the elements of the process. The cross-over and conditional processes create difficulties in the graph-to-text conversion because there is no directly translatable structure provided in the available text languages which provide hierarchies of nested elements. To determine a correct conversion, graphical analysis may be undertaken to obtain a better semantic understanding of the process represented by the original graph.

Because there are no direct equivalents in the structural text-based representations for these types of node-connection configurations, there are a number of possible solutions that may be chosen in converting a graph-based representation of a business process to a structural text-based representation. This potential set of conversion possibilities creates problems with consistency of conversion as well as potential documentation problems, since some solutions are more difficult to document than others.

It is known, for example, to transform data published during the execution of a business process into a standard format such as XML, as mentioned in U.S. Patent Application No. 2002/0116362 (Li et al.). The business process representation may be constructed using a graphical process tool. However, Li et al. does not disclose a method or system for transforming the graphical representation of the business process itself to another format.

It is therefore desirable to provide a system and method for converting graphical representations of business processes containing cross-over and/or conditional processes to structural, text-based representations in a consistent manner that can be implemented automatically without requiring extensive semantic graphical analysis.

SUMMARY OF THE INVENTION

Accordingly, the present invention provides a system and method for converting a graphical business process representation to a structural, text-based representation.

An aspect of the invention provides a computer program product for converting an initial graphical representation of a business process having nodes and control connections to a structural text-based representation. The product includes program code for identifying as shared nodes those nodes in the initial graphical representation having more than one incoming control connection; program code for representing a segmented graph based on the initial graphical representation, the segmented graph comprising segments being defined by the location of shared nodes in the initial graphical representation; program code for obtaining a set of segment-based structural text-based representations corresponding to the segments in the segmented graph; program code for defining a resultant structural text-based representation comprising the set of segment-based structural text-based representations and in which each of the segment-based structural text-based representations is defined to potentially execute concurrently; and program code for generating synchronization elements in the resultant structural text-based representation defined with reference to the incoming control connections of the shared nodes in the initial graphical representation, while maintaining the semantics of the initial graphical representation in the resultant structural text-based representation. In a further aspect of the invention, the program code for generating synchronization elements may include code for generating link code portions in the resultant structural text-based representation, in which each link code portion textually represents a selected incoming control connection of the shared nodes in the initial graphical representation, and each incoming control connection is textually represented by one link code portion, where each incoming control connection connects a source node and a target node and each link code portion has a source activity and target activity, the source activity of the link code portion being the activity that represents the source node of the corresponding incoming control connection, the target activity of the link code portion being the activity that represents the target node of the corresponding incoming control connection. A further aspect of the invention provides program code for implementing dead path elimination in the resultant structural text-based representation.

A further aspect of the invention provides a computer-implemented method for converting an initial graphical representation of a business process to a resultant structural text-based representation, the initial graphical representation comprising nodes and control connections. The method comprises the steps of: defining a representation of a segmented graph based on the initial graphical representation, the segmented graph comprising segments being defined by the location of shared nodes in the initial graphical representation; obtaining a set of segment-based structural text-based representations corresponding to the segments in the segmented graph; generating a resultant structural text-based representation comprising the set of segment-based structural text-based representations and in which each of the segment-based structural text-based representations is defined to potentially execute concurrently; and generating synchronization elements in the resultant structural text-based representation defined with reference to the incoming control connections of the shared nodes in the source graphical representation, whereby the semantics of the initial graphical representation are maintained in the resultant structural text-based representation. Still a further aspect provides that the step of generating synchronization elements may include the steps of generating link code portions in the resultant structural text-based representation, each said link code portion textually representing a selected one of incoming control connections of the shared nodes in the initial graphical representation and each incoming control connection being textually represented by one link code portion, each incoming control connection connecting a source node and a target node and each link code portion having a source activity and target activity, the source activity of the link code portion being the activity that represents the source node of the corresponding incoming control connection, the target activity of the link code portion being the activity that represents the target node of the corresponding incoming control connection, and the step of generating structural text-based representation code for implementing dead path elimination in the resultant structural text-based representation.

Still a further aspect of the invention provides a computer implemented method for converting an initial graphical representation of a business process to a resultant representation, the initial graphical representation comprising nodes and control connections and the resultant representation being a structural text-based representation. The method comprises the steps of: identifying shared nodes in the initial graphical representation by collecting the nodes in the initial graphical representation and determining if each node contains multiple incoming connections; storing identified shared nodes in a data representation; traversing the initial representation and carrying out the following steps:

i. creating a structural element <sequence> in the resultant representation;

ii. for each node visited, translating the current node to a corresponding structural text-based representation activity in the resultant representation and marking the current node as "visited", the traversal skipping nodes already marked "visited"; and iii. generating a <sequence> structural element or a <flow> structural element in the resultant representation, whereby if there is only one outgoing control connection for the current node, no structural elements are generated and if there are multiple outgoing control connections for the current node a <flow> element is placed in the resultant representation and repeating all procedures in step (c) for each path connected by an outgoing control connection to the current node;

iv. repeating all steps in step (c) if the current node is a shared node and is not marked as "visited", the resultant representation comprising segment-defined code corresponding to nodes in the initial representation that are shared nodes;

then generating a structural element <flow> in the resultant representation whereby all segment-defined code in the resultant representation are included in the <flow> element; generating a synchronization element <link> to connect segment-defined code in the resultant representation corresponding to the control connections in for the shared nodes in the initial graphical representation, whereby the source of each such <link> element is the corresponding resultant representation activity that represents the source node of the control connection in the initial graphical representation and the target of each such <link> element is the corresponding resultant representation activity that represents the shared node that the control connection connects to in the initial graphical representation. In a further aspect, the invention may provide that for each current node in the traversal that is a conditional fault-handling node with conditionally activated terminals and corresponding conditional branches comprising segments, generating a <catch> element in the resultant representation for each such terminal and generating the first segment of the conditional branch within the <catch> element and further generating an <empty> element if the first segment is shared whereby the <empty> element acts as a <link> holder within each <catch> element, and for each current node in the traversal that is a conditional event-handling node with conditionally activated terminals and corresponding conditional branches comprising segments, generating a <pick> element for the event-handling node, generating an <on Message> element for each such terminal, generating the first segment of the conditional branch within an <on Message> element in the <pick> element, and farther generating an <empty> element if the first segment is shared whereby the <empty> element acts as a <link> holder within each <pick> element. Another aspect of the invention may provide that structural text-based representation code is generated for implementing dead path elimination in the resultant structural text-based representation. An aspect of the invention also provides that this computer-implemented method is executable using a computer program product on a recordable data storage medium.

The present invention provides the advantage of allowing conversion of graphical representations having "cross-over" and/or conditional configurations. Further, it allows high readability of the generated textual representations of business processes by facilitating the use of structural elements in text-based representations, in a manner that preserves a significant portion of the shape and flow logic of the business process represented in the graphical representation.

BRIEF DESCRIPTION OF THE DRAWINGS

The drawings briefly described below illustrate by way of example only a preferred embodiment of the invention.

DESCRIPTION OF THE PREFERRED EMBODIMENT

The preferred embodiment is described using examples of graph-based business process representations as supported by WebSphere™ Studio Application Developer Integration Edition (WSADIE) and text-based representations expressed in the BPEL4WS business process language. BPEL4WS is an XML-based language permitting the definition of hierarchical structures of nested elements to define various processes and protocols commonly used in business process notation. In this description, some BPEL4WS syntax has been removed from the code excerpts for ease of readability. It will be understood by those skilled in the art that the preferred embodiment may be implemented for other graph-based and structural text-based representations that share characteristics with those set out in the description below.

The examples of the preferred embodiment, below, are concerned with conversion (or export) of those parts of business process graphs which include cross-over or conditional configurations. The techniques for the conversion of other aspects of such graphical representations is not described and is to be accomplished using techniques known or developed by those skilled in the art.

The preferred embodiment requires identification of shared nodes, which in this specification are defined as nodes in a graphical representation of a business process having more than one incoming control connection. By identifying shared nodes and carrying out simple steps after identification, cross-over and conditional configurations may be consistently converted without requiring time-consuming graphical semantic analysis.

Figure 1:
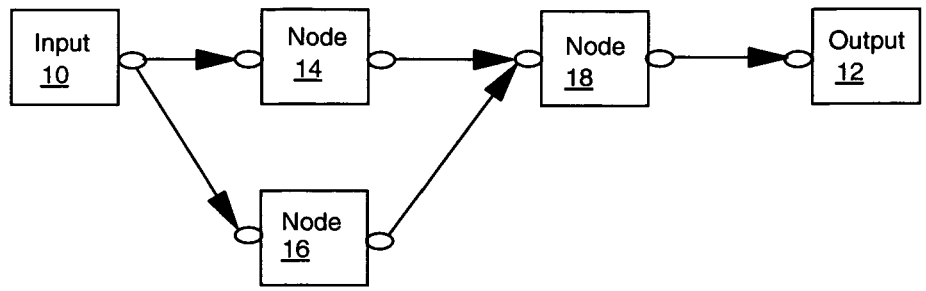
FIG. 1 illustrates a graphical representation of a business process containing a shared node.

The business process graph of FIG. 1 includes an example of a shared node. The process graph of FIG. 1 shows input node 10, output node 12 and activity nodes 14, 16, 18. Nodes 14, 16 have control connections to node 18, which is therefore a shared node.

Figure 2:
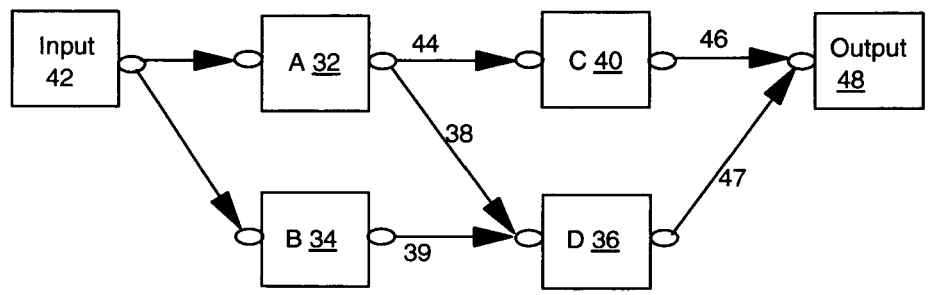
FIG. 2 illustrates a graphical representation of a business process containing a cross-over.

Similarly, the process graph of FIG. 2 illustrates two shared nodes. The configuration of FIG. 2 also includes a cross-over process configuration of nodes and control connections. In FIG. 2, node A 32 and node B 34 have control connections 38 and 39 to shared node D 36. Output node 48 is also a shared node since it is the target of two control connections 46 and 47 from nodes C 40 and D 36. The type of cross-over configuration of the process graph shown in FIG. 2 may present difficulties for consistent conversion to a text-based representation such as that made using BPEL4WS.

The preferred embodiment provides an approach to the conversion of graphs such as those shown in FIGS. 1 and 2 (including shared nodes) whereby consistent equivalent text-based representations may be obtained. In the preferred embodiment, the initial process graph is manipulated to define a segmented graph having a set of segments. Each segment in the segmented graph is converted into an equivalent textual representation. Where there are multiple segments in the segmented graph, the originally defined inter-segment control connections are referenced to complete the textual representation of the initial process graph.

Figure 3:
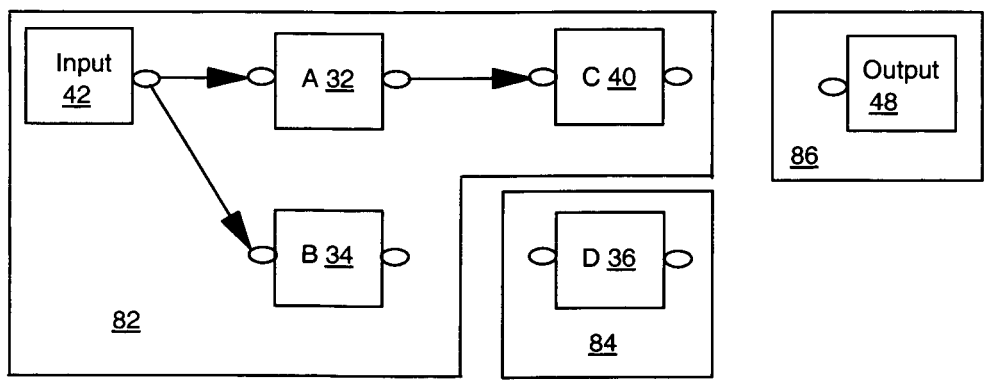
FIG. 3 is a segmented representation of the illustration of FIG. 2.

The segmented graph for the process graph of FIG. 2 is shown in FIG. 3. As referred to above, FIG. 2 contains shared node D 36 and shared output node 48. The FIG. 3 segmented graph is obtained by traversing the graph of FIG. 2 and defining a new segment at the input node and at each shared node. The segmented graph is the process graph with the incoming connections to that shared node removed. Whether the original process graph is itself modified to remove the connections, or whether there is a new graph created, will depend on implementation choices.

In the example of FIGS. 2 and 3, segment 82 is defined at input node 42. Segment 84 is defined due to node D 36 being a shared node. Similarly, output node 48 is a shared node and therefore segment 86 is defined in the segmented graph of FIG. 3. In the segmented graph, the multiple control connections that define shared nodes are removed from the graph.

Figure 4:
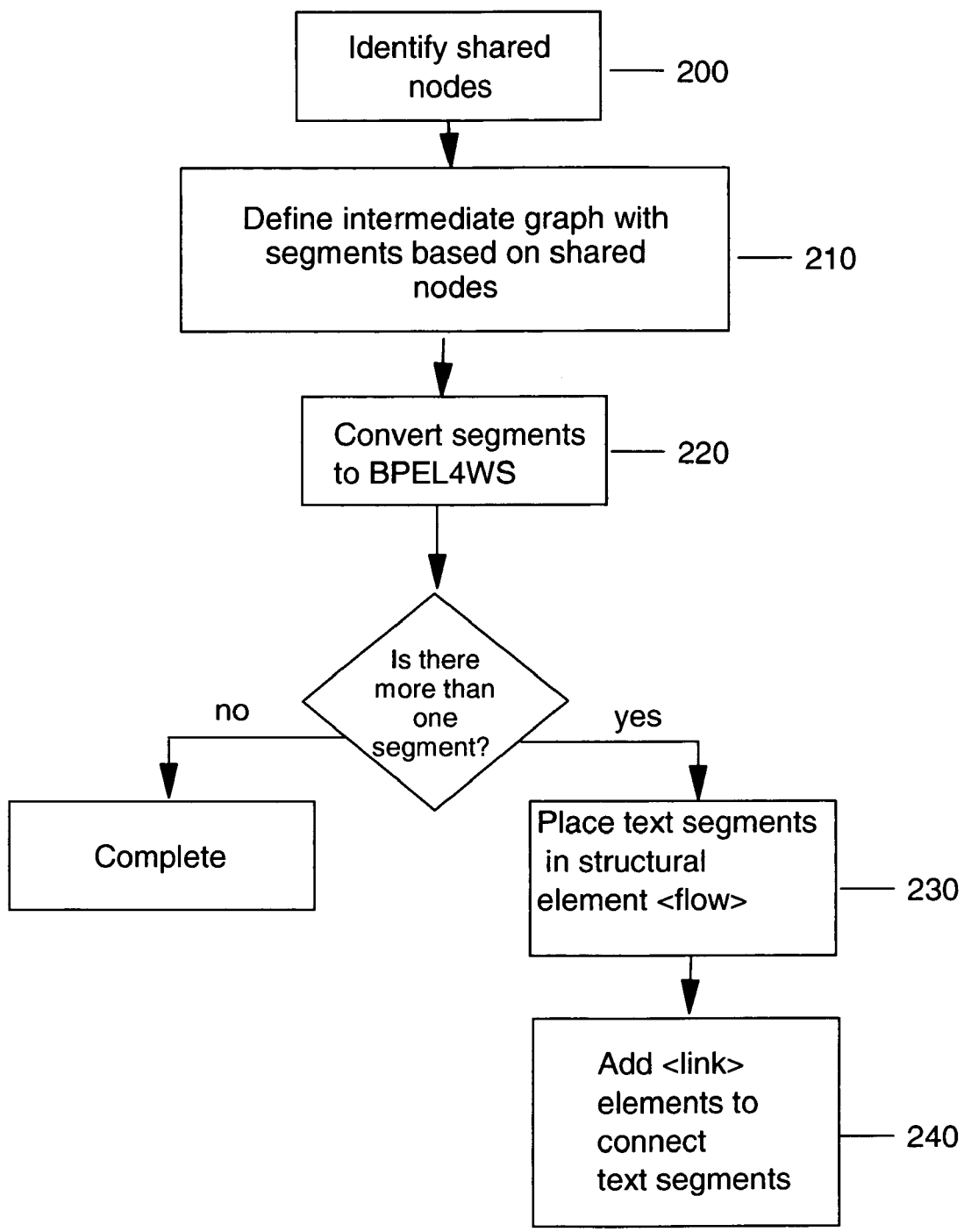
FIG. 4 is a flowchart representation of an embodiment of the method of the preferred embodiment applied to a graphical representation of a business process.

Using the approach set out above, the preferred embodiment exporter parses a process graph, generates an segmented graph, and generates an equivalent textual representation. Generally, in the preferred embodiment, the present invention performs the following steps in converting a cross-over process graph such as that shown in FIG. 2 (the steps are shown in the flowchart of FIG. 4 and the reference numerals to that figure are given below in parentheses):

1. All shared nodes in the process graph are identified (200);
2. An intermediate process graph is generated by creating segments where shared nodes are found in the initial process graph (by removing the incoming connections to the shared nodes) (210);
3. Each segment in the intermediate process graph is converted to an equivalent text segment in the target text-based, structured business process language (220);

If there is only one segment, then there is no shared node issue and the conversion is complete. Otherwise, if there are several segments, the conversion continues with the following steps:

4. All converted text segments are defined to be concurrent with each other. In BPEL4WS, this is accomplished by placing the segments within a single <flow> structure (230);
5. All converted text segments corresponding to shared nodes are further subject to a synchronization control in the text-based language to correspond to the control connections to the shared nodes in the initial process graph. In BPEL4WS this is accomplished using the <link> synchronization element to connect all of the converted text segments that correspond to shared nodes (240).

IN BPEL4WS, the <link> synchronization element is an implementation of a pair of <source> and <target> elements that constrains the execution of activities that may otherwise run concurrently. An activity may be declared as the source of one or more links through the inclusion of one or more <source> elements; the activities that are the targets of these are designated by the inclusion of a <target> element bearing the same distinct <link> name. If an activity is defined as the target in a <link> implementation, then it will not execute until the <source> activity is evaluated as having completed.

Applying the above steps to process graph shown in FIG. 2, node D 36 and output node 48 are identified as shared nodes due to the respective multiple incoming control connections (control connections 38 and 39 for node D 36, and control connections 46 and 47 for output node 48). The initial process graph is divided into three segments to obtain the segmented graph, shown in FIG. 3, as segments 82, 84, and 86. The first segment 82 includes input node 42, node A 32, node B 34, and node C 40. The second segment 84 contains only shared node D 36. The third segment 86 contains only shared node output 48. As will be appreciated by those skilled in the art, although the preferred embodiment is described as defining an segmented graph such as that shown in FIG. 3, it is sufficient that the segmentation shown in the segmented graph is identified in a manner that is then usable to define the appropriate text-based converted segments. Different implementations may represent this information in different manners, although the information corresponds to what is shown in the segmented graph set out in FIG. 3.

The business process activities and connections defined in each of the segments in the segmented graph are converted to an equivalent text-based representation. In the example of FIGS. 2 and 3 of the preferred embodiment, this conversion is shown with respect to a notional set of activities A, B, C, D shown in nodes 32, 34, 40, 36, respectively. An example set of three BPEL4WS fragments relating to the three segments 82, 84, 86 is shown below:

```
<!--Segment 82 begins -->
<sequence>
    <receive .../>
    <flow>
        <sequence>
            <invoke name="A"></invoke>
            <invoke name="C"></invoke>
        </sequence>
        <invoke name="B"></invoke>
    </flow>
</sequence>
<!--Segment 82 ends -->
<!--Segment 84 begins -->
<invoke name="D"></invoke>
<!--Segment 84 ends -->
<!--Segment 86 begins -->
<reply ...></reply>
<!--Segment 86 ends -->
```

According to the preferred embodiment, the three fragments of text-based representation corresponding to the segments in the segmented graph are placed within a single structure defining concurrent processing for the converted segment text fragments. In the example of FIGS. 2 and 3, since there are three segments 82, 84, and 86 for the process graph shown in FIG. 3, the text-based representations for those segments are placed within the BPEL4WS structural element <flow>.

The control connections pointing to shared nodes in the initial process graph are then referenced to define synchronization structure for the converted text-based representation. In the example of the preferred embodiment, the BPEL4WS <link> structure is used to define the required synchronization and control relationships in the converted text-based representation.

```
<flow>
    <links>
        <link name="FlowConditionalControlConnection_38"/>
        <link name="FlowConditionalControlConnection_39"/>
        <link name="FlowConditionalControlConnection_46"/>
        <link name="FlowConditionalControlConnection_47"/>
    </links>
    <sequence>
        <receive .../>
        <flow>
            <sequence>
                <invoke name="A">
                    <source linkName=
                        "FlowConditionalControlConnection_38"/>
                </invoke>
                <invoke name="C">
                    <source linkName=
                        "FlowConditionalControlConnection_46"/>
                </invoke>
            </sequence>
            <invoke name="B">
                <source linkName=
                    "FlowConditionalControlConnection_39"/>
            </invoke>
        </flow>
    </sequence>
    <!-- Shared Activities begin -->
    <reply ...>
        <target linkName="FlowConditionalControlConnection_46"/>
        <target linkName="FlowConditionalControlConnection_47"/>
    </reply>
    <invoke name="D">
        <source linkName="FlowConditionalControlConnection_47"/>
        <target linkName="FlowConditionalControlConnection_38"/>
        <target linkName="FlowConditionalControlConnection_39"/>
```

```
        </invoke>
    <!-- Shared Activities end -->
</flow>
```

As may be seen from the above example, the synchronization and control provided by the preferred embodiment results in an equivalent text-based representation of the cross-over configuration found in the process graph example of FIG. 2. Although the three converted text segments corresponding to segments 82, 84 and 86 in the segmented graph of FIG. 2 are placed in the <flow> element of the converted BPEL4WS representation, the use of the synchronization links ensures that business process is equivalently represented. In the above example, activity D 36 will not start until activities A 32 and B 34 complete because of the defined source and target locations for the synchronization <link> elements defined for control connections 38, 39. Similarly, activity output 48 will not start until activities C 40 and D 36 complete, due to the defined source and target elements for the link elements corresponding to control connections 46, 47. Consequently, the resulting BPEL4WS business process will behave in the same manner as the process graph shown in FIG. 2.

As will be appreciated by those skilled in the art, this approach to conversion of graph-based business process representations that include shared nodes may be implemented in a system for automatically identifying shared nodes and carrying out the appropriate graph manipulations and conversions to the text-based target. The preferred embodiment provides for a consistent conversion of graph-based to text-based business process representations where a shared node is found in the graph-based representation. Potential problems associated with conversion of cross-over configurations are handled by the system and method of the preferred embodiment.

The preferred embodiment may also be used to convert process graphs containing conditional processes such as those elements such as those commonly referred to in BPEL4WS notation as "pick" or "fault" configurations, respectively used to represent event handling and fault handling in business process representations. Conditional elements within the graphical representation of a business process with event handling may be used to determine which path in the graph should be taken based on a received event. Conditional elements in a graphical representation of a business process with fault handling may be used to determine which fault-handling path in the graph should be taken when a fault is thrown.

Figure 5:
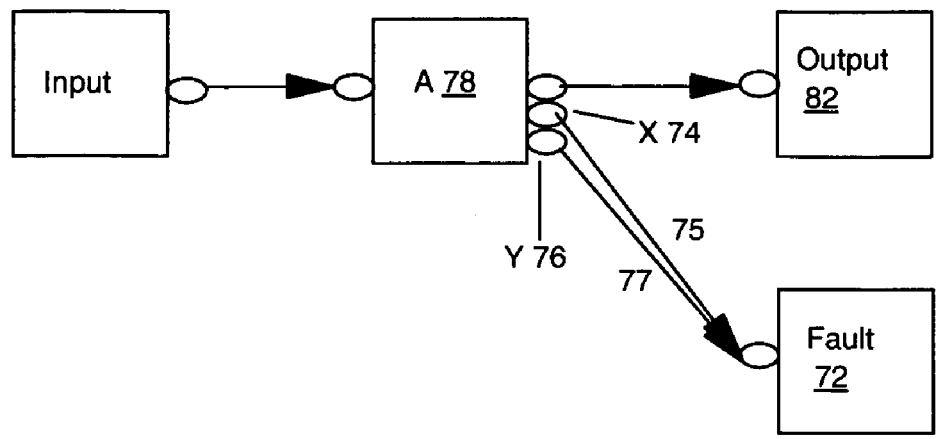
FIG. 5 illustrates a graphical representation of a business process containing a fault.

A conditional node such as a fault handling or event handling node may be represented graphically as a node with one or more output terminals. For example, a fault handling process is shown in FIG. 5. In FIG. 5, there are two control connections from two terminals in node A 78 point which both point to a single fault node 72.

Figure 6:
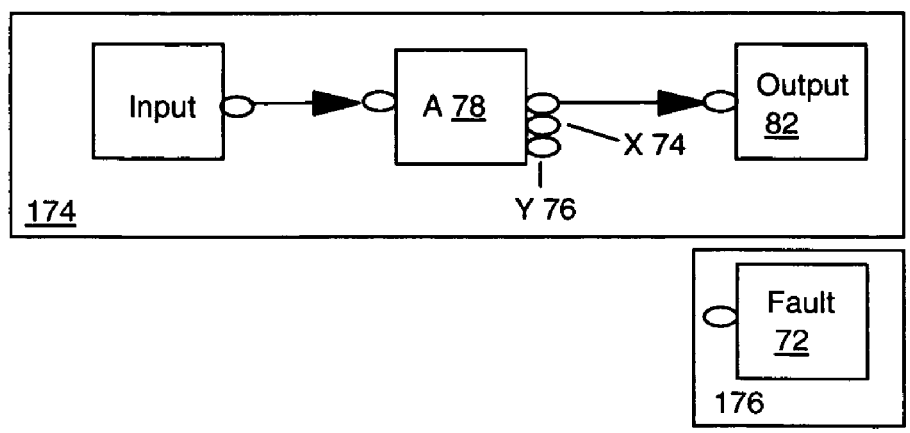
FIG. 6 is a segmented representation of the illustration of FIG. 5.

FIGS. 5 and 6 set out a simple example which illustrates how the preferred embodiment handles the presence of multiple conditional control connections leading to a shared node in a graph-based business process representation.

According to the preferred embodiment, the graphical representation of FIG. 5 is divided into two segments 174 and 176, as shown in the segmented graph representation of FIG. 6. Segment 174 contains the input node, activity node A 78 and output node 82. Segment 176 contains only shared fault node 72. As set out above, segments 174, 176 are converted to the BPEL4WS equivalent. The text-based segments are placed in a single <flow> structure.

In the preferred embodiment, conditional control connections are converted to the conditional element <catch> in BPEL4WS. In the example, the fault paths shown in FIG. 5 are connections to shared node 72 and are therefore defined in the text-based representation using synchronization and control elements (the link element in BPEL4WS). In the preferred embodiment, the fault terminals in node A 78 are modeled with <catch> elements. Because the fault paths point to a shared node, the contents of the catch elements will be link elements, in the text-based representation. Further, due to the definition of the BPEL4WS language, a link must relate to an activity and for this reason an <empty> activity (a null or placeholder activity) is also included in the appropriate <catch> elements in the resulting equivalent text-based representation.

In the example of FIGS. 5 and 6, segment 176 contains the shared fault node 72. Since this node is pointed to by control connections from fault terminals 74, 76, <empty> activities are inlined within the two <catch> elements that relate to those terminals in the text-based segment representations. The <empty> activities act as <link> holders for the <source> elements. As is shown below, <reply> activity Fault1 72 is the target of both links indicated by the <target> elements. The resultant code for the example has following structure:

```
<flow>
    <links>
        <link name="FlowControlConnection_75"/>
        <link name="FlowControlConnection_77"/>
        <link name="DPELink_AToReply"/>
    </links>
    <!--Segment 174 begins -->
    <sequence>
        <receive .../>
        <invoke name="A">
            <catch faultName="ns3:FaultX">
                <empty>
                    <source linkName="FlowConditionalControlConnection_75"
                    />
                </empty>
            <catch faultName="ns3:FaultY">
                <empty>
                    <source linkName="FlowConditionalControlConnection_77"
                    />
                </empty>
            </catch>
            <source linkName="DPELink_AToReply"/>
        </invoke>
        <reply name="reply">
            <target linkName="DPELink_AToReply"/>
        </reply>
    </sequence>
    <!--Segment 174 ends -->
    <!-- Shared Activities begin -->
    <!--Segment 176 begins -->
    <reply faultName="Fault72">
        <target linkName="FlowConditionalControlConnection_75"/>
        <target linkName="FlowConditionalControlConnection_77"/>
    </reply>
    <!--Segment 176 ends -->
    <!-- Shared Activities end -->
</flow>
```

As is described with respect to the example of FIGS. 2 and 3, text-based representations corresponding to segments 174, 176 in FIG. 6 are placed in a single <flow> element in the resulting text-based representation. The relationship of the catch and link elements in the above example ensure that the activity corresponding to Fault 72 will not start until either FaultX or FaultY is thrown by activity A 78. According to the definition of BPEL4WS, once either FaultX or FaultY is thrown, the status of the link corresponding to the fault caught is set to true and the status of the outgoing link within the <catch> element that will not be performed will be set to false. At that time the status of both incoming links of the target activity can be determined, and in the BPEL4WS implementation of the preferred embodiment, the target reply activity will then run, as the target elements for the defined links will each have a determined value. The resulting BPEL4WS representation of the business process will behave in the same manner as the business process represented in FIG. 5.

Figure 7:
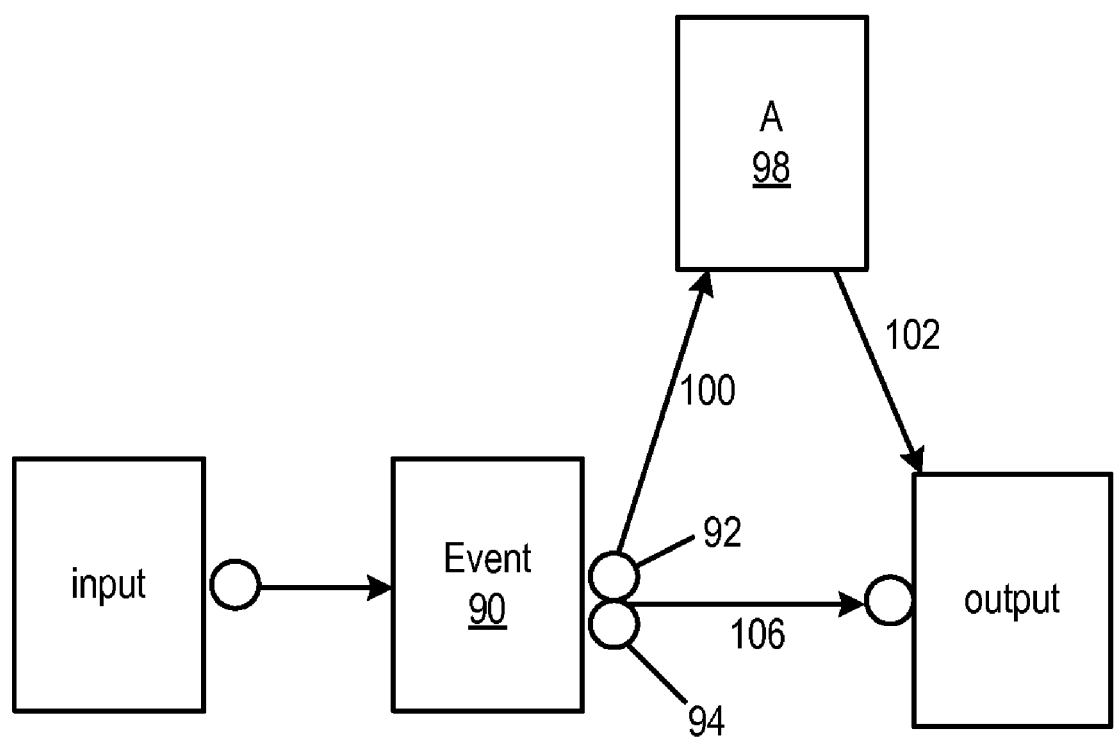
FIG. 7 illustrates a graphical representation of a business process containing a receive event node.

An example of a conditional node for event handling is shown in FIG. 7. The receive event node has two terminals 92, 94, each of which is associated with an event. If one of these events occurs, then control over the process will pass through the associated terminal and all activities that are inlined with that terminal will run, while the activities associated with the other terminal will not. In the example of FIG. 7, when the event associated with terminal 92 occurs, then the process at node A 98 will be executed (connection 100 is followed; after execution of node A 98, connection 102 is followed to output node 104). In such a case connection 106 will not be followed. Conversely, connection 106 is followed to output node 104 when the event associated with terminal 94 occurs before the event for terminal 92. In this case, connection 100 is not followed. In the preferred embodiment, such a conditional structure is modelled in a similar manner to the fault handling scenario, but using a <pick> element rather than <catch> and representing each terminal with an <on Message> structure. If node A 98 were pointed to by more than one control connection, then <empty> activities would be inlined within the two <on Message> elements that relate to those terminals in the text-based segment representations. The <empty> activities act as <link> holders for <source> elements.

In a structural solution to converting a graphical representation of a business process to a text-based representation, dead path elimination is a concern. In a graphical representation, dead path elimination is implied in the representation. In a structural text-based representation, explicit structures are necessary to handle dead path elimination. For example, once a fault is thrown, the rest of the normal sequence path should be eliminated. In the pattern mappings to the structural text-based representation, link elements are included in sequence structures to handle dead path elimination.

Preferably, dead path elimination links ("DPE links") comply with the following naming convention:

link name="DPELink_"+[source node name]+"To"+ [target node name]

Figure 8:
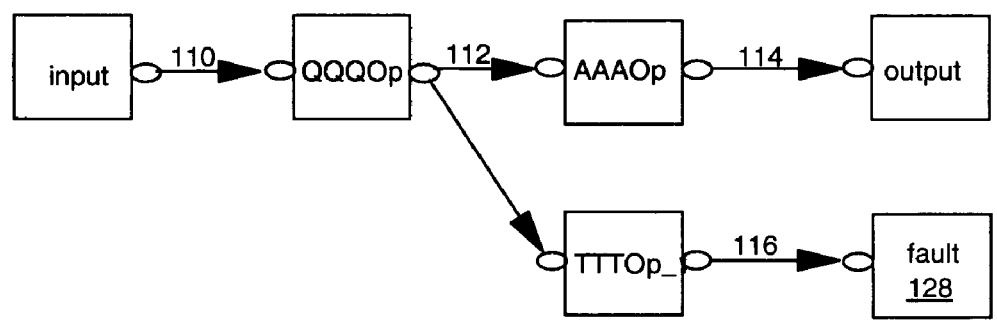
FIG. 8 illustrates a graphical representation of a business process containing a fault node.
Figure 9:
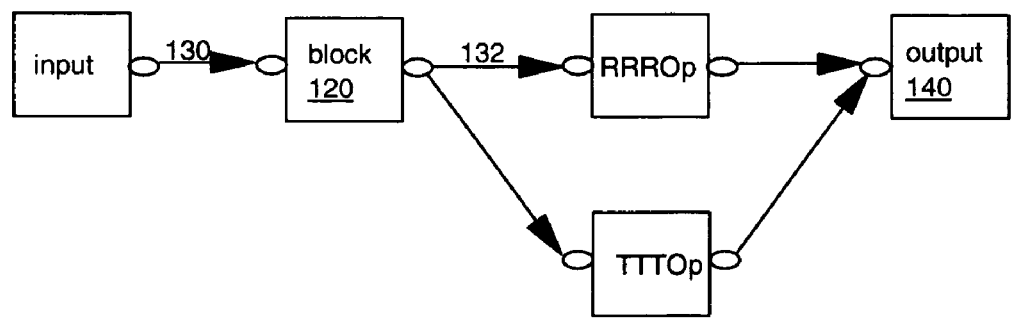
FIG. 9 illustrates a graphical representation of a business process containing a shared node.

An example of the handling of dead path elimination by the exporter is given with reference to FIGS. 8 and 9. FIG. 8 shows the body of a block with a fault node 128. FIG. 9 illustrates a graphical representation of a process with a shared node, containing block node 120 with a fault, the body of the block being that shown in FIG. 9.

In the preferred embodiment, the structure of the resultant code is as follows:

```
<!-- from BPEL4WS file -->
<flow>
  <links>
```

```
    <link name="FlowConditionalControlConnection_4"/>
    <link name="FlowConditionalControlConnection_5"/>
    <link name="DPELink_receiveTosequence"/>
    <link name="DPELink_sequenceToRRROp"/>
    <link name="DPELink_Input_InputToQQQOp"/>
    <link name="DPELink_QQQOpToAAAOp"/>
    <link name="DPELink_AAAOpToOutput_Output"/>
    <link name="DPELink_TTTOp_1ToFault"/>
  </links>
  <sequence>
    <receive container="input" createInstance="yes"
      operation="TTTProcessOp" portType="ns2:TTTPortType">
      <source linkName="DPELink_receiveTosequence"/>
    </receive>
    <scope containerAccessSerializable="no" name="Block">
      <faultHandlers>
        <catch faultName="ns3:QQQFaultMsg">
          <invoke inputContainer="tTTInputMsg" name="TTTOp"
            operation="TTTOp" outputContainer="tTTOutputMsg"
            portType="ns2:TTTPortType">
            <source
              linkName="FlowConditionalControlConnection_4"/>
          </invoke>
        </catch>
      </faultHandlers>
      <sequence>
        <empty name="Input_Input">
          <source linkName="DPELink_Input_InputToQQQOp"/>
        </empty>
        <invoke inputContainer="qQQInputMsg" name="QQQOp"
          operation="QQQOp" outputContainer="qQQOutputMsg"
          portType="ns3:QQQPortType">
          <catch faultContainer="qQQFaultMsg"
            faultName="ns3:qqqFault">
            <sequence>
              <invoke inputContainer="tTTInputMsg1"
                name="TTTOp_1" operation="TTTOp"
                outputContainer="tTTOutputMsg1"
                portType="ns2:TTTPortType">
                <source linkName="DPELink_TTTOp_1ToFault"
                />
              </invoke>
              <throw faultContainer="Fault"
                faultName="ns3:QQQFaultMsg" name="Fault">
                <target
                  linkName="DPELink_TTTOp_1ToFault"/>
              </throw>
            </sequence>
          </catch>
          <target linkName="DPELink_Input_InputToQQQOp"/>
          <source linkName="DPELink_QQQOpToAAAOp"/>
        </invoke>
        <invoke inputContainer="aAAInputMsg" name="AAAOp"
          operation="AAAOp" outputContainer="aAAOutputMsg"
          portType="ns5:AAAPortType">
          <target linkName="DPELink_QQQOpToAAAOp"/>
          <source linkName="DPELink_AAAOpToOutput_
            Output"/>
        </invoke>
        <empty name="Output_Output">
          <target linkName="DPELink_AAAOpToOutput_
            Output"/>
        </empty>
        <target linkName="DPELink_receiveTosequence"/>
        <source linkName="DPELink_sequenceToRRROp"/>
      </sequence>
    </scope>
    <invoke inputContainer="rRRInputMsg" name="RRROp" operation="
      RRROp"
      outputContainer="rRROutputMsg" portType="ns4:RRRPortType">
      <source linkName="FlowConditionalControlConnection_5"/>
      <target linkName="DPELink_sequenceToRRROp"/>
    </invoke>
  </sequence>
  <!--Shared Activities begin.-->
  <reply container="output" operation="TTTProcessOp"
    portType="ns2:TTTPortType">
    <target linkName="FlowConditionalControlConnection_4"/>
    <target linkName="FlowConditionalControlConnection_5"/>
```

-continued

```
    </reply>
    <!--Shared Activities end.-->
        </flow>
```

In the preferred embodiment, when fault handling is detected, dead path elimination links are added to all sequences in the structural text-based representation of the process (three in this case). In the main sequence shown in FIG. 7, a DPE link is created for control connection 130 between the <receive> activity and block 120. Another DPE link is created for the control connection 132 between block node 120 and the <invoke> activity RRROp. This link is necessary because if a fault is thrown, the RRROp activity should not be executed because it is in the same sequence as the <scope> of the block, however it will be executed unless there is a link to prevent it. In the sequence inside the <scope> activity, a DPE link is created for the control connection 110 between the <empty> input and the <invoke> activity QQQOp. Another DPE link is created for the control connection 112 between the QQQOp activity and the <invoke> activity AAAOp. Finally, a DPE link is created for the control connection 114 between the AAAOp activity and the <empty> output. The links between the QQQOp activity, the AAAOp activity, the AAAOp activity, and the output are necessary in case a fault is thrown and that path must be eliminated. In the sequence for the catch, there is a DPE link for control connection 116 between the TTTOp_1 activity and fault node 128.

A detailed description of the method of the present invention in accordance with the preferred embodiment is as follows:

Step 1: Define Shared Nodes

Begin at the input node, the initial node of the graphical representation of the business process. Identify all shared nodes by collecting all nodes in the graphical representation and checking each to see if any of the nodes contain multiple incoming connections. Store shared nodes in memory for use in Step 2.

Step 2: Generate Segments of the Graphical Representation i. Create a structural element <sequence> as the root of the current segment.

ii. Translate the current node to its corresponding BPEL4WS activity. For example, if the current node is an input node, it may be translated to a <receive> activity. Place the generated activity into its current segment, and mark the current node as "visited". For nodes that are marked "visited", the method skips the node and generates nothing.

iii. Continue to the next available node by traversing the outgoing control connections of the current node. Repeat (ii) of Step 2 if the next node is not marked as "visited". Also generate the structural element, <sequence> or <flow>, to model the flow structure, based on the following rules:

1. If there is only one outgoing control connection, do not generate any structural elements.

2. If there are multiple outgoing control connections, generate a <flow> element and place it into the current segment. Repeat all procedures in Step 2 for each path connected by an outgoing control connection. This will result in creating a BPEL4WS activity that represents the branch. These activities are placed into the <flow> element, such that the <flow> element maintains the flow of the process.

iv. If the current node is a shared node and is not marked as "visited", the current segment is completed. All procedures in Step 2 are repeated using the shared node as the initial node of a new segment. As a result, the new segment contains the shared node and its subsequent nodes. Place both segments in memory for use in Step 3.

v. If the current node is a service node with fault terminals, generate a <catch> element for each fault terminal and inline the first segment of the fault branch within the <catch> element. If the first segment is shared, an <empty> element that acts as a <link> holder will be inlined within each <catch> element instead. Place the rest of the segments in memory for use in Step 3.

vi. If the current node is a node with event terminals, generate a <pick> element for the node, and an <on Message> structure for each event terminal, and inline the first segment of the event branch, within the <on Message> element. If the first segment is shared, an <empty> element acting as a <link> holder will be inlined within each <on Message> element instead. Place the rest of the segments in memory for use in Step 3.

vii. The walking procedure ends when all nodes have been examined as all of the segments in the process graph have been stored in memory.

Step 3: Connect the Segments i. If there are multiple segments, place all the segments into the structural element <flow>.

ii. Generate a synchronization element <link> to connect up the segments that had a control connection between them. The source of the <link> element is the corresponding BPEL4WS activity that represents the source node of the control connection. The target of the <link> element is the corresponding BPEL4WS activity that represents the shared node that the control connection connects to. Once the segments that should be connected are connected, the conversion is complete.

An alternative embodiment of the method of the present invention for a business process language that does not support conditional elements would be as above except that it would omit Step 2(v).

Thus, the method and system described above, through the application of structural elements, preserve a significant portion of the flow logic and "shape" of the original graphical representation of the business process in the text-based representation. Even where graphical representations contain cross-over or conditional configurations, linking elements in the structural text-based representation are used only when necessary to constrain the flow of the process and to retain the full semantics of the graphical representation. Dead path elimination may also be carried out, where necessary.

As the preferred embodiment of the present invention has been described in detail by way of example, it will be apparent to those skilled in the art that variations and modifications may be made without departing from the invention. The invention includes all such variations and modifications as fall within the scope of the appended claims.

What is claimed is:

1. A computer program product for converting an initial graphical representation of a business process to a structural text-based representation, the initial graphical representation comprising nodes and control connections, the computer program product comprising a computer usable medium having computer readable program code means embodied in said medium, and comprising:

computer readable program code means for identifying as shared nodes those nodes in the initial graphical representation having more than one incoming control connection;

computer readable program code means for representing a segmented graph based on the initial graphical representation, the segmented graph comprising segments being defined by the location of shared nodes in the initial graphical representation;

computer readable program code means for obtaining a set of segment-based structural text-based representations corresponding to the segments in the segmented graph;

computer readable program code means for defining a resultant structural text-based representation comprising the set of segment-based structural text-based representations and in which each of the segment-based structural text-based representations is defined to execute concurrently; and computer readable program code means for generating synchronization elements in the resultant structural text-based representation defined with reference to the incoming control connections of the shared nodes in the initial graphical representation, wherein semantics of the initial graphical representation are maintained in the resultant structural text-based representation.

2. The computer program product of claim 1, in which said computer readable program code means for generating synchronization elements further comprises means for generating link code portions in the resultant structural text-based representation, each said link code portion textually representing a selected one of incoming control connections of the shared nodes in the initial graphical representation and each of the incoming control connections being textually represented by one of said link code portions, each of the incoming control connections connecting a source node and a target node and each of said link code portions having a source activity and target activity, the source activity of the link code portion being the activity that represents the source node of the corresponding incoming control connection, the target activity of the link code portion being the activity that represents the target node of the corresponding incoming control connection.

3. The computer program product of claim 2, in which said computer readable program code means for generating synchronization elements in the resultant structural text-based representation defined with reference to the incoming control connections of the shared nodes in the initial graphical representation further comprises means for implementing dead path elimination in the resultant structural text-based representation.

4. A computer implemented method for converting an initial graphical representation of a business process to a resultant structural text-based representation, the initial graphical representation comprising nodes and control connections, said method comprising:

identifying as shared nodes those nodes in the initial graphical representation having more than one incoming control connection;

defining a representation of a segmented graph based on the initial graphical representation, the segmented graph comprising segments being defined by location of the shared nodes in the initial graphical representation;

obtaining a set of segment-based structural text-based representations corresponding to the segments in the segmented graph;

generating a resultant structural text-based representation comprising the set of segment-based structural text-based representations and in which each of the segment-based structural text-based representations is defined to execute concurrently; and generating synchronization elements in the resultant structural text-based representation defined with reference to the incoming control connections of the shared nodes in the initial graphical representation, wherein semantics of the initial graphical representation are maintained in the resultant structural text-based representation.

5. The method of claim 4, wherein said generating synchronization elements further comprises generating link code portions in the resultant structural text-based representation, each said link code portion textually representing a selected one of the incoming control connections of the shared nodes in the initial graphical representation and each incoming control connection being textually represented by one of the link code portions, each of the incoming control connections connecting a source node and a target node and each of the link code portions having a source activity and target activity, the source activity of the link code portion being the activity that represents the source node of the corresponding incoming control connection, the target activity of the link code portion being the activity that represents the target node of the corresponding incoming control connection.

6. The method of claim 5, wherein said generating synchronization elements in the resultant structural text-based representation further comprises generating structural text-based representation code for implementing dead path elimination in the resultant structural text-based representation.

7. A computer implemented method for converting an initial graphical representation of a business process to a resultant representation, the initial graphical representation comprising nodes and control connections and the resultant representation being a structural text-based representation, said method comprising:

a. identifying shared nodes in the initial graphical representation by collecting the nodes in the initial graphical representation and determining if whether each node contains multiple incoming connections;

b. storing identified shared nodes in a data representation;

c. traversing the initial representation and carrying out the following steps:

i. creating a structural element <sequence> in the resultant representation;

ii. for each node visited, translating the current node to a corresponding structural text-based representation activity in the resultant representation and marking the current node as "visited", the traversal skipping nodes already marked "visited"; and iii. generating a <sequence> structural element or a <flow> structural element in the resultant representation, whereby if there is only one outgoing control connection for the current node, no structural elements are generated and if there are multiple outgoing control connections for the current node a <flow> element is placed in the resultant representation and repeating the procedures in said step (c) for each path connected by an outgoing control connection to the current node;

iv. repeating said step (c) if the current node is a shared node and is not marked as "visited", the resultant representation comprising segment-defined code corresponding to nodes in the initial representation that are shared nodes;
d. generating a structural element <flow> in the resultant representation whereby all segment-defined code in the resultant representation are included in the <flow> element; and
e. generating a synchronization element <link> to connect segment-defined code in the resultant representation corresponding to the control connections in for the shared nodes in the initial graphical representation, whereby the source of each such <link> element is the corresponding resultant representation activity that represents the source node of the control connection in the initial graphical representation and the target of each such <link> element is the corresponding resultant representation activity that represents the shared node that the control connection connects to in the initial graphical representation.

8. The method of claim 7, further comprising:
f. for each current node in the traversal that is a conditional fault-handling node with conditionally activated terminals and corresponding conditional branches comprising segments, generating a <catch> element in the resultant representation for each such terminal and generating the first segment of the conditional branch within the <catch> element and further generating an <empty> element when the first segment is shared whereby the <empty> element acts as a <link> holder within each <catch> element.

9. The method of claim 8, further comprising:
g. for each current node in the traversal that is a conditional event-handling node with conditionally activated terminals and corresponding conditional branches comprising segments, generating a <pick> element for the event-handling node, generating an <on Message> element for each such terminal, generating the first segment of the conditional branch within an <on Message> element in the <pick> element, and further generating an <empty> element when the first segment is shared whereby the <empty> element acts as a <link> holder within each <pick> element.

10. The method of claim 9, in which said step (e) further comprises generating structural text-based representation code for implementing dead path elimination in the resultant structural text-based representation.

11. The computer program product of claim 1, wherein the medium is a recordable data storage medium.

* * * * *